US012627644B2

(12) United States Patent
Ransom et al.

(10) Patent No.: US 12,627,644 B2
(45) Date of Patent: May 12, 2026

(54) SYSTEMS AND METHODS FOR SERVICE ENTITLEMENT AUTHORIZATION

(71) Applicant: Comcast Cable Communications, LLC, Philadelphia, PA (US)

(72) Inventors: Mumin Ransom, Philadelphia, PA (US); Sunil Verma, Philadelphia, PA (US); Michael Winslow, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 389 days.

(21) Appl. No.: 17/979,374

(22) Filed: Nov. 2, 2022

(65) Prior Publication Data

US 2024/0146706 A1 May 2, 2024

(51) Int. Cl.
*H04L 9/40* (2022.01)
*H04W 12/30* (2021.01)

(52) U.S. Cl.
CPC .............. *H04L 63/08* (2013.01); *H04L 63/10* (2013.01); *H04W 12/35* (2021.01)

(58) Field of Classification Search
CPC ....... H04L 63/08; H04L 63/10; H04L 63/083; H04W 12/35
See application file for complete search history.

(56) References Cited

U.S. PATENT DOCUMENTS

| | | | | |
|---|---|---|---|---|
| 5,682,478 A * | 10/1997 | Watson | .................... | H04L 67/14 |
| | | | | 726/19 |
| 7,558,844 B1 * | 7/2009 | Heidelberger | ...... | H04L 12/2876 |
| | | | | 709/224 |
| 8,005,459 B2 * | 8/2011 | Balsillie | ................ | H04W 12/06 |
| | | | | 455/410 |
| 8,667,579 B2 | 3/2014 | Leeder | | |
| 8,966,318 B1 * | 2/2015 | Shah | .................... | G06F 11/3664 |
| | | | | 714/28 |
| 9,038,102 B1 * | 5/2015 | Gopinath | ........... | H04N 21/4223 |
| | | | | 725/38 |
| 9,154,497 B1 * | 10/2015 | Balzam | .................. | H04L 63/083 |
| 9,380,077 B2 * | 6/2016 | Martini | .................... | H04L 69/14 |
| 9,432,336 B2 * | 8/2016 | Ostrowski | ............ | G06F 21/606 |
| 9,438,575 B2 * | 9/2016 | Shi | .......................... | H04L 63/18 |
| 9,703,800 B1 * | 7/2017 | Korshunov | ............. | H04L 63/08 |
| 9,749,224 B2 * | 8/2017 | Bitar | ..................... | H04L 45/308 |
| 9,779,232 B1 * | 10/2017 | Paczkowski | ........ | H04L 63/0838 |
| 10,346,122 B1 * | 7/2019 | Morgan | ................ | G06F 3/0484 |
| 10,382,445 B1 * | 8/2019 | Mantel | ............... | G06Q 20/3223 |
| 10,439,921 B1 * | 10/2019 | Dubey | ................. | H04W 24/08 |
| 10,511,685 B2 * | 12/2019 | Kumar | .................. | H04L 67/306 |
| 10,733,283 B1 * | 8/2020 | Osborn | ................ | H04L 63/083 |
| 10,742,659 B1 * | 8/2020 | Roka | .................... | H04L 63/0884 |
| 10,769,262 B1 * | 9/2020 | Ziraknejad | ............. | G06F 21/45 |
| 10,834,594 B1 * | 11/2020 | Mahurkar | ............. | H04W 12/69 |

(Continued)

*Primary Examiner* — Aravind K Moorthy

(74) *Attorney, Agent, or Firm* — Banner & Witcoff, Ltd.

(57) ABSTRACT

Systems, apparatuses, and methods are described for streamlined entitlement authorization. After a new device joins a network, a network device may provide the new device with the option to automatically authenticate the new device for a plurality of services that are available to other devices on the network. A user may choose the option, and the new device may automatically send login requests to the plurality of services, to automatically authenticate the new device.

36 Claims, 11 Drawing Sheets

(56) References Cited

U.S. PATENT DOCUMENTS

| | | | | |
|---|---|---|---|---|
| 10,853,780 B1* | 12/2020 | Sirota | G06Q 10/06 | |
| 10,986,226 B1* | 4/2021 | Krebs | H04M 3/42042 | |
| 11,030,299 B1* | 6/2021 | Ilincic | H04L 63/0861 | |
| 11,063,930 B1* | 7/2021 | Bose | H04L 63/0428 | |
| 11,070,540 B1* | 7/2021 | Singh | H04L 63/104 | |
| 11,159,326 B1* | 10/2021 | Nelson | G06F 3/0484 | |
| 11,171,990 B1* | 11/2021 | Yenamandra | H04L 63/1433 | |
| 11,233,835 B1* | 1/2022 | Facusselentz | H04L 65/764 | |
| 11,252,250 B1* | 2/2022 | Shmukler | H04L 67/10 | |
| 11,290,687 B1* | 3/2022 | Becchetti | H04N 7/15 | |
| 11,411,954 B1* | 8/2022 | Kozlovski | H04L 63/0281 | |
| 11,444,949 B1* | 9/2022 | Fletcher | H04W 12/06 | |
| 11,516,220 B1* | 11/2022 | Singh | H04L 63/104 | |
| 11,528,301 B1* | 12/2022 | Saraf | G06F 21/62 | |
| 11,570,523 B1* | 1/2023 | Panchaksharaiah | H04N 21/4826 | |
| 11,575,968 B1* | 2/2023 | Barlik | H04N 21/278 | |
| 11,641,505 B1* | 5/2023 | Maker | H04N 21/47202 | |
| | | | 725/86 | |
| 11,743,162 B1* | 8/2023 | Tusnial | H04L 41/147 | |
| | | | 705/26.1 | |
| 11,818,143 B1* | 11/2023 | Fischer | H04L 63/126 | |
| 11,823,191 B1* | 11/2023 | Bedi | G06Q 20/3267 | |
| 11,824,872 B1* | 11/2023 | Meyer | G06F 21/6245 | |
| 11,860,771 B1* | 1/2024 | Jain | G06F 11/3688 | |
| 11,870,647 B1* | 1/2024 | Zhang | H04L 41/5051 | |
| 11,874,808 B1* | 1/2024 | Kondal | G06Q 30/01 | |
| 11,916,761 B1* | 2/2024 | Ghoshal | H04W 8/18 | |
| 11,922,495 B1* | 3/2024 | Hernandez | G06Q 40/03 | |
| 11,997,112 B1* | 5/2024 | Sanders | H04L 63/10 | |
| 12,113,892 B2* | 10/2024 | Desvignes | H04L 9/3247 | |
| 12,174,935 B2* | 12/2024 | Chen | G06Q 10/00 | |
| 12,175,387 B2* | 12/2024 | Bax | G06Q 50/01 | |
| 12,177,210 B2* | 12/2024 | Hertrich | H04L 9/3263 | |
| 2006/0225130 A1* | 10/2006 | Chen | H04L 63/0407 | |
| | | | 713/184 | |
| 2006/0242415 A1* | 10/2006 | Gaylor | H04L 9/3271 | |
| | | | 713/176 | |
| 2006/0294587 A1* | 12/2006 | Bowden | G06F 21/57 | |
| | | | 726/22 | |
| 2007/0271586 A1* | 11/2007 | Alperin | H04N 21/25875 | |
| | | | 725/109 | |
| 2008/0271126 A1* | 10/2008 | Saraf | H04L 63/08 | |
| | | | 726/5 | |
| 2008/0274687 A1* | 11/2008 | Roberts | H04N 21/47202 | |
| | | | 455/3.06 | |
| 2008/0301052 A1* | 12/2008 | Yonge, III | H04L 45/16 | |
| | | | 705/50 | |
| 2009/0089380 A1* | 4/2009 | Wang | G06Q 10/06 | |
| | | | 709/206 | |
| 2009/0125997 A1* | 5/2009 | Cook | H04L 63/0853 | |
| | | | 726/6 | |
| 2009/0191918 A1* | 7/2009 | Mardiks | H04W 8/265 | |
| | | | 455/558 | |
| 2009/0208020 A1* | 8/2009 | Grynberg | H04L 9/3263 | |
| | | | 726/5 | |
| 2010/0131589 A1* | 5/2010 | Lawyer | G06Q 20/425 | |
| | | | 709/203 | |
| 2010/0325687 A1* | 12/2010 | Iverson | G06F 21/41 | |
| | | | 717/134 | |
| 2011/0107436 A1* | 5/2011 | Cholas | H04N 21/2585 | |
| | | | 726/29 | |
| 2011/0167274 A1* | 7/2011 | Swamidas | H04L 63/08 | |
| | | | 713/176 | |
| 2012/0185920 A1* | 7/2012 | Zmener | H04L 63/0892 | |
| | | | 726/4 | |
| 2012/0222099 A1* | 8/2012 | Narendra | H04L 63/0853 | |
| | | | 726/6 | |
| 2012/0317261 A1* | 12/2012 | Ahmavaara | H04L 67/141 | |
| | | | 709/223 | |
| 2013/0005487 A1* | 1/2013 | Frazzini | H04L 67/1085 | |
| | | | 463/43 | |
| 2013/0067081 A1* | 3/2013 | Liu | H04W 12/06 | |
| | | | 709/225 | |
| 2013/0169546 A1* | 7/2013 | Thomas | G06F 3/04883 | |
| | | | 345/173 | |
| 2013/0239189 A1* | 9/2013 | Ionescu | H04L 63/08 | |
| | | | 726/6 | |
| 2013/0346564 A1* | 12/2013 | Warrick | H04L 12/1886 | |
| | | | 709/219 | |
| 2013/0347075 A1* | 12/2013 | Narendra | G06F 21/31 | |
| | | | 726/4 | |
| 2014/0165165 A1* | 6/2014 | Story, Jr. | H04W 12/0431 | |
| | | | 726/6 | |
| 2014/0215356 A1* | 7/2014 | Brander | G06F 21/84 | |
| | | | 715/753 | |
| 2014/0215595 A1* | 7/2014 | Prasad | G06F 21/41 | |
| | | | 726/8 | |
| 2014/0250511 A1* | 9/2014 | Kendall | G06F 21/44 | |
| | | | 726/6 | |
| 2015/0019323 A1* | 1/2015 | Goldberg | G06Q 30/0242 | |
| | | | 705/14.41 | |
| 2015/0081860 A1* | 3/2015 | Kuehnel | G06F 21/316 | |
| | | | 709/224 | |
| 2015/0095989 A1* | 4/2015 | An | H04L 63/10 | |
| | | | 726/4 | |
| 2015/0178059 A1* | 6/2015 | Lindheimer | H04L 67/14 | |
| | | | 717/178 | |
| 2015/0180976 A1* | 6/2015 | Xiao | H04L 67/52 | |
| | | | 709/203 | |
| 2015/0181031 A1* | 6/2015 | Warnack | H04L 65/1069 | |
| | | | 370/259 | |
| 2015/0181367 A1* | 6/2015 | Nguyen | H04W 8/005 | |
| | | | 455/552.1 | |
| 2015/0227752 A1* | 8/2015 | Anakata | G06F 8/62 | |
| | | | 726/29 | |
| 2015/0304605 A1* | 10/2015 | Hartman | H04N 7/15 | |
| | | | 725/109 | |
| 2015/0326448 A1* | 11/2015 | Chaudhary | G06Q 20/14 | |
| | | | 705/40 | |
| 2015/0327069 A1* | 11/2015 | Fu | H04W 76/10 | |
| | | | 726/5 | |
| 2016/0094883 A1* | 3/2016 | Tidwell | H04N 21/812 | |
| | | | 725/109 | |
| 2016/0105400 A1* | 4/2016 | Straub | H04L 63/062 | |
| | | | 713/168 | |
| 2016/0227017 A1* | 8/2016 | Kotab | H04W 4/40 | |
| 2016/0248744 A1* | 8/2016 | Adderly | H04L 63/102 | |
| 2016/0308876 A1* | 10/2016 | Smith, III | H04L 63/102 | |
| 2016/0337386 A1* | 11/2016 | Ford | H04L 63/1466 | |
| 2016/0380919 A1* | 12/2016 | Wang | H04L 65/611 | |
| | | | 370/312 | |
| 2016/0380989 A1* | 12/2016 | Bailey | H04L 63/08 | |
| | | | 726/5 | |
| 2017/0011214 A1* | 1/2017 | Cavanagh | H04L 63/0846 | |
| 2017/0045879 A1* | 2/2017 | Yang | G05B 19/409 | |
| 2017/0094345 A1* | 3/2017 | Zerr | H04N 21/6583 | |
| 2017/0124342 A1* | 5/2017 | Panchapakesan | H04N 21/2541 | |
| 2017/0171588 A1* | 6/2017 | Phillips | H04N 21/6125 | |
| 2017/0189806 A1* | 7/2017 | Watson | A63F 13/795 | |
| 2017/0200021 A1* | 7/2017 | Patel | H04L 65/70 | |
| 2017/0264604 A1* | 9/2017 | Drako | H04L 63/102 | |
| 2017/0264654 A1* | 9/2017 | Hardt | H04L 63/083 | |
| 2017/0289591 A1* | 10/2017 | Blohowiak | H04N 21/44209 | |
| 2017/0295401 A1* | 10/2017 | Panje | H04N 21/4663 | |
| 2017/0314981 A1* | 11/2017 | Flockenhaus | H04W 4/02 | |
| 2018/0004370 A1* | 1/2018 | Silvas | G06F 16/954 | |
| 2018/0034795 A1* | 2/2018 | Los | G06F 21/41 | |
| 2018/0063857 A1* | 3/2018 | Caplan | H04N 21/25866 | |
| 2018/0070113 A1* | 3/2018 | Phillips | H04N 21/6405 | |
| 2018/0070389 A1* | 3/2018 | Morgan | H04W 76/10 | |
| 2018/0083959 A1* | 3/2018 | Barbosa | H04W 12/068 | |
| 2018/0139496 A1* | 5/2018 | Gustafsson | H04N 21/2393 | |
| 2018/0192264 A1* | 7/2018 | Kwok | H04W 12/08 | |
| 2018/0262335 A1* | 9/2018 | Bergner | H04L 9/0866 | |
| 2018/0287869 A1* | 10/2018 | Munafo | H04W 12/069 | |
| 2018/0309762 A1* | 10/2018 | Hussain | H04L 63/0281 | |
| 2018/0373596 A1* | 12/2018 | Bhowmik | G06F 11/1435 | |
| 2018/0375659 A1* | 12/2018 | Kozma | H04L 63/083 | |

(56) References Cited

U.S. PATENT DOCUMENTS

| | | | |
|---|---|---|---|
| 2019/0018702 A1* | 1/2019 | O'Driscoll | G06F 16/437 |
| 2019/0020649 A1* | 1/2019 | Banga | H04L 63/067 |
| 2019/0141398 A1* | 5/2019 | Auxer | H04N 21/472 |
| 2019/0141399 A1* | 5/2019 | Auxer | H04N 21/4753 |
| 2019/0243964 A1* | 8/2019 | Shukla | G06F 21/54 |
| 2019/0349369 A1* | 11/2019 | Bengtson | H04L 67/52 |
| 2019/0356649 A1* | 11/2019 | Alwen | H04L 9/0861 |
| 2019/0370456 A1* | 12/2019 | Abbasian | G06F 21/78 |
| 2019/0373675 A1* | 12/2019 | Chari | H04W 88/182 |
| 2019/0386886 A1* | 12/2019 | Saxena | H04L 41/0895 |
| 2020/0036697 A1* | 1/2020 | Minami | H04L 63/0876 |
| 2020/0042742 A1* | 2/2020 | Bailey | G06Q 50/01 |
| 2020/0045038 A1* | 2/2020 | Mumma | G06F 21/41 |
| 2020/0195994 A1* | 6/2020 | Eluvan | H04N 21/23439 |
| 2020/0204544 A1* | 6/2020 | Soriano | H04L 63/0861 |
| 2020/0304379 A1* | 9/2020 | Bitterfeld | H04L 63/083 |
| 2020/0304863 A1* | 9/2020 | Domm | G06F 3/04886 |
| 2020/0314086 A1* | 10/2020 | Zeck | G06F 3/0482 |
| 2021/0081533 A1* | 3/2021 | Chiueh | G06F 8/65 |
| 2021/0099288 A1* | 4/2021 | Soriano | H04L 9/0894 |
| 2021/0099416 A1* | 4/2021 | Yoshikawa | H04L 51/224 |
| 2021/0133727 A1* | 5/2021 | Ratcliffe | G06Q 20/0457 |
| 2021/0136074 A1* | 5/2021 | Zichao | H04L 63/104 |
| 2021/0141880 A1* | 5/2021 | Pauli | G06F 3/013 |
| 2021/0168150 A1* | 6/2021 | Ross | G06F 16/9024 |
| 2021/0248623 A1* | 8/2021 | Scheidiger | G06N 7/01 |
| 2021/0256111 A1* | 8/2021 | Ilincic | H04L 63/083 |
| 2021/0266637 A1* | 8/2021 | Punja | H04N 21/4667 |
| 2021/0291058 A1* | 9/2021 | Dura | A63F 13/655 |
| 2021/0297496 A1* | 9/2021 | Harb | H04L 67/306 |
| 2021/0349974 A1* | 11/2021 | Uchibori | G06F 21/105 |
| 2021/0350252 A1* | 11/2021 | Alexander | G06F 16/906 |
| 2021/0357934 A1* | 11/2021 | Kunjukrishnan | G06Q 20/14 |
| 2021/0373942 A1* | 12/2021 | Lv | H04L 63/0815 |
| 2021/0385217 A1* | 12/2021 | Benko | H04L 9/3073 |
| 2021/0409397 A1* | 12/2021 | Bhatt | H04L 63/0884 |
| 2022/0021715 A1* | 1/2022 | Du | A63F 13/92 |
| 2022/0021751 A1* | 1/2022 | Devine | H04L 9/3234 |
| 2022/0070000 A1* | 3/2022 | Gondza | H04L 63/123 |
| 2022/0092825 A1* | 3/2022 | Lorry | G06F 3/0488 |
| 2022/0159048 A1* | 5/2022 | Newton | H04N 5/2624 |
| 2022/0159419 A1* | 5/2022 | Frolovichev | G06F 3/04845 |
| 2022/0161145 A1* | 5/2022 | Hardee | G06F 3/04845 |
| 2022/0171579 A1* | 6/2022 | Ushinohama | G06F 3/1207 |
| 2022/0191457 A1* | 6/2022 | Byeon | H04N 13/194 |
| 2022/0200800 A1* | 6/2022 | Xu | H04L 9/0822 |
| 2022/0201116 A1* | 6/2022 | Desserrey | H04M 1/72454 |
| 2022/0209954 A1* | 6/2022 | Na | H04L 9/085 |
| 2022/0210227 A1* | 6/2022 | Ichitsuka | H04L 63/08 |
| 2022/0240086 A1* | 7/2022 | McClement | H04W 12/06 |
| 2022/0248089 A1* | 8/2022 | Dhiman | H04N 21/8541 |
| 2022/0286289 A1* | 9/2022 | Pellizzer | H04L 9/3242 |
| 2022/0294778 A1* | 9/2022 | Li | H04L 63/0838 |
| 2022/0295151 A1* | 9/2022 | Sheldon | H04N 21/234336 |
| 2022/0303354 A1* | 9/2022 | Takahashi | H04L 67/51 |
| 2022/0366033 A1* | 11/2022 | Krishna | G06F 21/46 |
| 2022/0366068 A1* | 11/2022 | Sankar | G06F 16/2379 |
| 2022/0366430 A1* | 11/2022 | Steckel | H04L 51/21 |
| 2022/0382407 A1* | 12/2022 | Baker | G06F 9/452 |
| 2022/0394024 A1* | 12/2022 | Bulgakov | H04L 67/51 |
| 2022/0397988 A1* | 12/2022 | Whelan | G06F 3/04883 |
| 2022/0398289 A1* | 12/2022 | Armstrong | G06F 16/9558 |
| 2022/0417228 A1* | 12/2022 | Singh | H04L 63/062 |
| 2023/0007932 A1* | 1/2023 | Siddiqui | H04W 12/08 |
| 2023/0018134 A1* | 1/2023 | Ding | H04N 21/4781 |
| 2023/0019529 A1* | 1/2023 | Kumar Agrawal | G06F 21/32 |
| 2023/0026368 A1* | 1/2023 | Silverstein | G06F 16/986 |
| 2023/0026917 A1* | 1/2023 | Frolovichev | H04L 65/4015 |
| 2023/0030230 A1* | 2/2023 | Lyons | H04L 9/50 |
| 2023/0059126 A1* | 2/2023 | Arling | H04L 67/34 |
| 2023/0062137 A1* | 3/2023 | Golda | G06F 3/0484 |
| 2023/0064979 A1* | 3/2023 | Slowiak | H04L 63/0884 |
| 2023/0087963 A1* | 3/2023 | Doken | H04N 21/4532 |
| | | | 725/12 |
| 2023/0098097 A1* | 3/2023 | Vaid | H04W 12/03 |
| | | | 726/1 |
| 2023/0101347 A1* | 3/2023 | Byington | G06F 21/36 |
| | | | 726/17 |
| 2023/0103886 A1* | 4/2023 | Sharma | H04L 9/3213 |
| | | | 726/8 |
| 2023/0110527 A1* | 4/2023 | Bhat | H04L 63/102 |
| | | | 726/4 |
| 2023/0121443 A1* | 4/2023 | Dhanwal | H04N 21/44226 |
| | | | 386/241 |
| 2023/0129344 A1* | 4/2023 | Mueller | H04B 7/0691 |
| | | | 455/450 |
| 2023/0131942 A1* | 4/2023 | Thomas | H04N 21/44226 |
| | | | 725/14 |
| 2023/0139813 A1* | 5/2023 | Thiel | G06F 21/31 |
| | | | 726/7 |
| 2023/0168786 A1* | 6/2023 | Mantri | H04L 63/083 |
| | | | 715/740 |
| 2023/0171442 A1* | 6/2023 | Babu | H04N 21/2407 |
| | | | 725/25 |
| 2023/0177478 A1* | 6/2023 | Dolan | G06Q 20/3274 |
| | | | 705/42 |
| 2023/0177831 A1* | 6/2023 | Singh | G06F 9/451 |
| | | | 715/748 |
| 2023/0179998 A1* | 6/2023 | McCracken, Jr. | H04W 12/06 |
| | | | 726/6 |
| 2023/0196239 A1* | 6/2023 | Lv | G06Q 10/0633 |
| | | | 705/7.27 |
| 2023/0196632 A1* | 6/2023 | Yamada | H04S 7/302 |
| | | | 345/672 |
| 2023/0206233 A1* | 6/2023 | Aument | G06Q 20/4016 |
| | | | 705/44 |
| 2023/0228594 A1* | 7/2023 | Waskiewicz | G01C 21/3837 |
| | | | 701/532 |
| 2023/0246851 A1* | 8/2023 | Lind | H04L 9/3247 |
| 2023/0283593 A1* | 9/2023 | Dhariya | H04L 63/0428 |
| | | | 726/15 |
| 2023/0362152 A1* | 11/2023 | Sharma | H04L 67/34 |
| 2023/0362153 A1* | 11/2023 | Wanpen | H04L 67/02 |
| 2023/0401299 A1* | 12/2023 | Zhang | G06F 3/0484 |
| 2023/0412616 A1* | 12/2023 | Goldstein | H04L 63/1416 |
| 2024/0005386 A1* | 1/2024 | Thurairatnam | G06Q 20/4014 |
| 2024/0007377 A1* | 1/2024 | Kannan | H04L 43/0864 |
| 2024/0020376 A1* | 1/2024 | Li | G06F 21/46 |
| 2024/0053712 A1* | 2/2024 | Nixon | G05B 19/4186 |
| 2024/0064379 A1* | 2/2024 | Rajbhat | H04N 21/4784 |
| 2024/0073215 A1* | 2/2024 | Yee | H04L 63/102 |
| 2024/0087369 A1* | 3/2024 | Kujirai | H04N 7/18 |
| 2024/0098323 A1* | 3/2024 | Biggs | H04N 21/251 |
| 2024/0098479 A1* | 3/2024 | Griot | H04W 12/0431 |
| 2024/0106696 A1* | 3/2024 | Ovadia | H04L 25/0212 |
| 2024/0106818 A1* | 3/2024 | Nimbavikar | H04L 63/0861 |
| 2024/0144200 A1* | 5/2024 | Srivastava | G06Q 20/102 |
| 2024/0146737 A1* | 5/2024 | Rothschild | H04L 9/0891 |
| 2024/0380741 A1* | 11/2024 | Jogand-Coulomb | H04L 63/08 |
| 2025/0219849 A1* | 7/2025 | Gupta | H04L 9/3268 |
| 2025/0322061 A1* | 10/2025 | Zhou | G06F 21/46 |

* cited by examiner

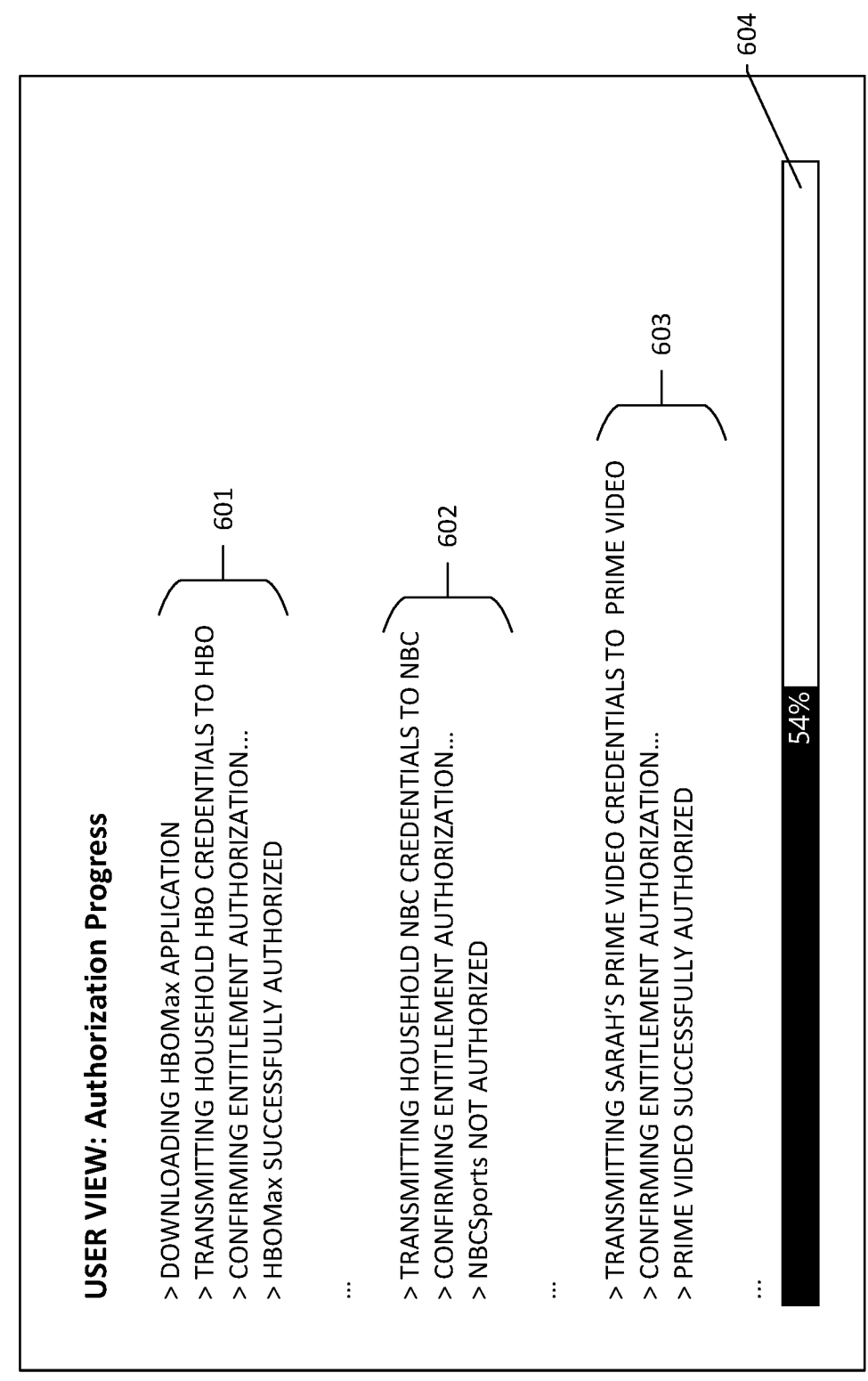

USER VIEW: Authorization Progress

> DOWNLOADING HBOMax APPLICATION
> TRANSMITTING HOUSEHOLD HBO CREDENTIALS TO HBO
> CONFIRMING ENTITLEMENT AUTHORIZATION...
> HBOMax SUCCESSFULLY AUTHORIZED

...

601

> TRANSMITTING HOUSEHOLD NBC CREDENTIALS TO NBC
> CONFIRMING ENTITLEMENT AUTHORIZATION...
> NBCSports NOT AUTHORIZED

...

602

> TRANSMITTING SARAH'S PRIME VIDEO CREDENTIALS TO  PRIME VIDEO
> CONFIRMING ENTITLEMENT AUTHORIZATION...
> PRIME VIDEO SUCCESSFULLY AUTHORIZED

DETAIL VIEW: Authorization Process for Provider (HBO)

> DOWNLOAD HBOMax APPLICATION

> TRANSMIT USER INFORMATION TO HBO

> RECEIVE CONFIRMATION THAT USER IS IN HBO SYSTEM

> INDICATE TO HBO THAT NEW DEVICE ASSOCIATED WITH USER IS DETECTED ON NETWORK

> TRANSMIT NEW DEVICE INFORMATION TO HBO (e.g., MAC address, etc.)

> RETRIEVE AUTHORIZATION TOKEN FOR NEW DEVICE FROM HBO

605

800A

800B

SYSTEMS AND METHODS FOR SERVICE ENTITLEMENT AUTHORIZATION

BACKGROUND

New devices (e.g., televisions) support execution of various applications (e.g., for content delivery services such as PEACOCK, NETFLIX, etc.), but when a user adds such a new device to their network, the user may find it inconvenient to initialize those applications (e.g., logging into the applications with the user's credentials to authorize the applications on the new device).

SUMMARY

The following summary presents a simplified summary of certain features. The summary is not an extensive overview and is not intended to identify key or critical elements.

Systems, apparatuses, and methods are described for simplified entitlement authorization. An entitlement repository may store user credentials for a variety of services. After a new device joins a network, an authentication aggregator may coordinate with the entitlement repository to automatically guide the new device through a process of authorizing various services for use by the user. Also or alternatively, after a new device joins a network, authentication and entitlement information may begin to be pre-authorized for the new device prior to a user inputting login credentials. A gateway may begin the automatic authorization process after a new device joins its network. A user may be prompted to select one or more applications for authorization associated with services to which the user may be entitled. The authentication aggregator may retrieve user entitlement data from a repository, automatically initiate communication sessions with service providers for the applications, and obtain authorization for the new device to use the applications. Authorizations of entitled services may be performed for multiple services together (e.g., batch-processed). Batch-processing the entitlement authorizations may allow for more efficient configuration of devices, and may provide for a more user-friendly installation of the new device.

Some streaming services may have their entitlements linked with other services. For example, the streaming service for HBOMAX may be made available to users who include the HBO service in their channel subscription lineup with their local service provider. The authentication aggregator may use account information for one service (e.g., the channel subscription lineup that includes HBO) to automatically authenticate associated streaming services (e.g., the HBOMAX streaming application).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6A shows an example of authorization progress messages.

DETAILED DESCRIPTION

Figure 1:
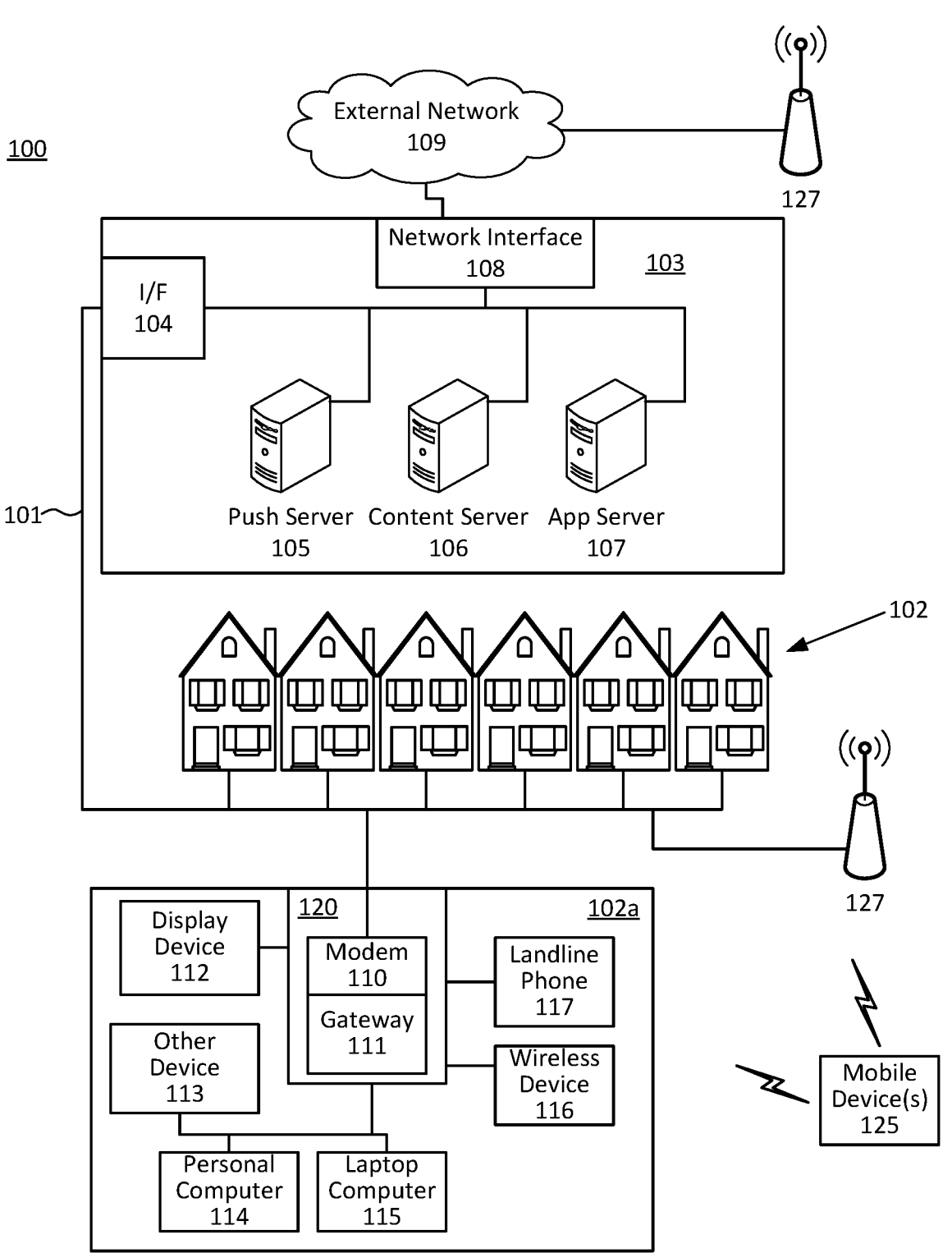
FIG. 1 shows an example communication network.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. There may be different content servers 106 to support different sources of content (e.g., PEACOCK, NETFLIX, HBOMAX, etc.). The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers.

Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
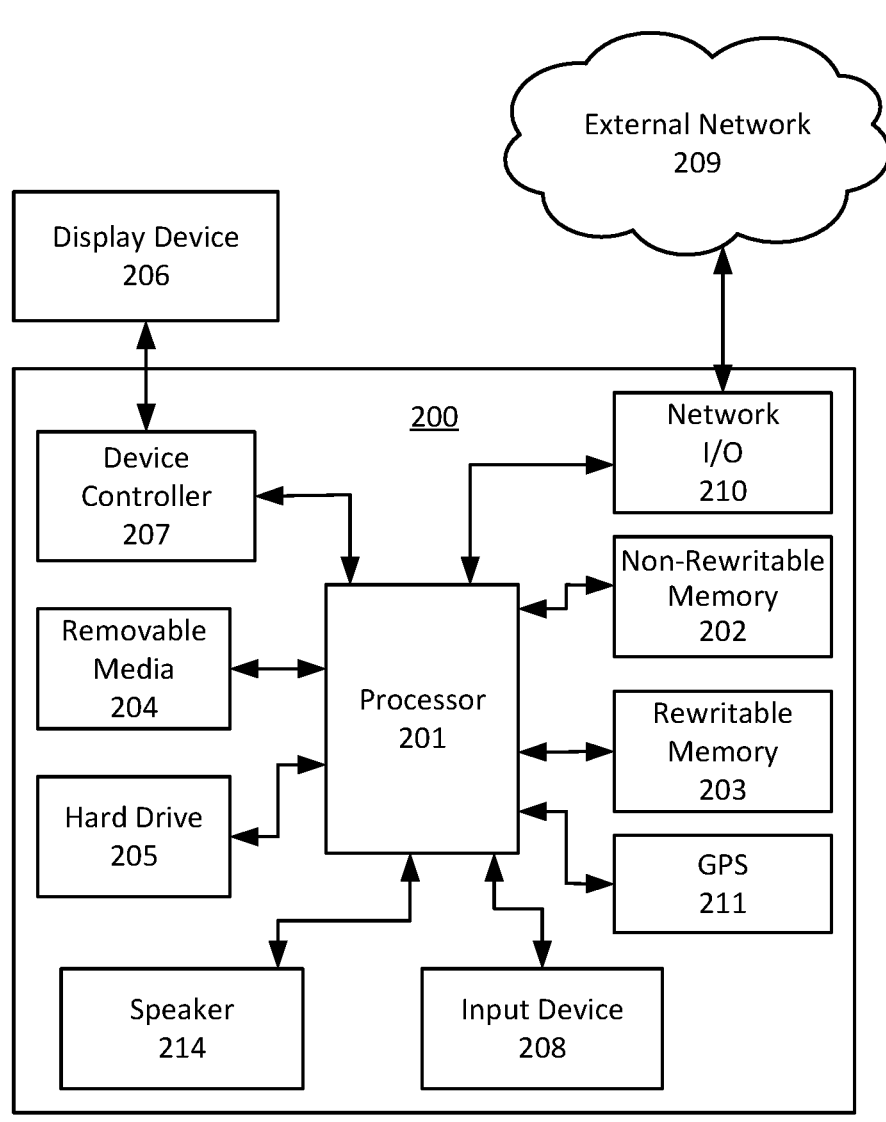
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As will be described herein, automatically authorizing one or more services (e.g., over-the-top services) for new devices joining networks may improve user experiences and decrease time spent configuring user devices prior to use. After a new device joins a network, such as a wireless network provided by the gateway 111, an authentication aggregator (which may be any device in the premises 102a, such as the gateway 111, the interface 120, etc.) may detect the addition of the new device (e.g., a wi-fi controller in the gateway 111 may instruct an authentication aggregator application in the gateway 111 that a new device has joined the network, and may provide information identifying a type of the new device) and may determine that the new device is suitable for automatic service authorization. The authentication aggregator may retrieve user entitlement data from a repository, automatically initiate communication sessions with the new device and/or service providers for services that the user may use on the new device, and manage authentication of those services on the new device. The retrieval of entitlement data (e.g., login credentials, authorization tokens, etc.), communication with the new device, communication with the service providers, and/or the authentication of services may be performed sequentially for multiple services. For example, the gateway 111 may automatically determine that the user has an aggregated services package (e.g., a video subscription package with a local video provider such as COMCAST) that entitles the user to use the HBOMAX streaming service, so the gateway 111 may automatically retrieve the user's video subscription information, and use that information to communicate with the HBOMAX service to obtain an authorization token for the new device. The entitlement to HBOMAX may be linked to the entitlement to the channel HBO in a service lineup in the user's subscription package with the local video provider, such that entitlement to one includes entitlement to the other. The gateway 111 may automatically authenticate the new device for a variety of service types. The service types may be any type, including content streaming. The services may be services provided as part of (or linked with) another service, such as an embedded supplemental experience within a streaming audio/video content item. The services may be over-the-top services, such as a standalone software application that can execute independently of a video stream.

Figure 3:
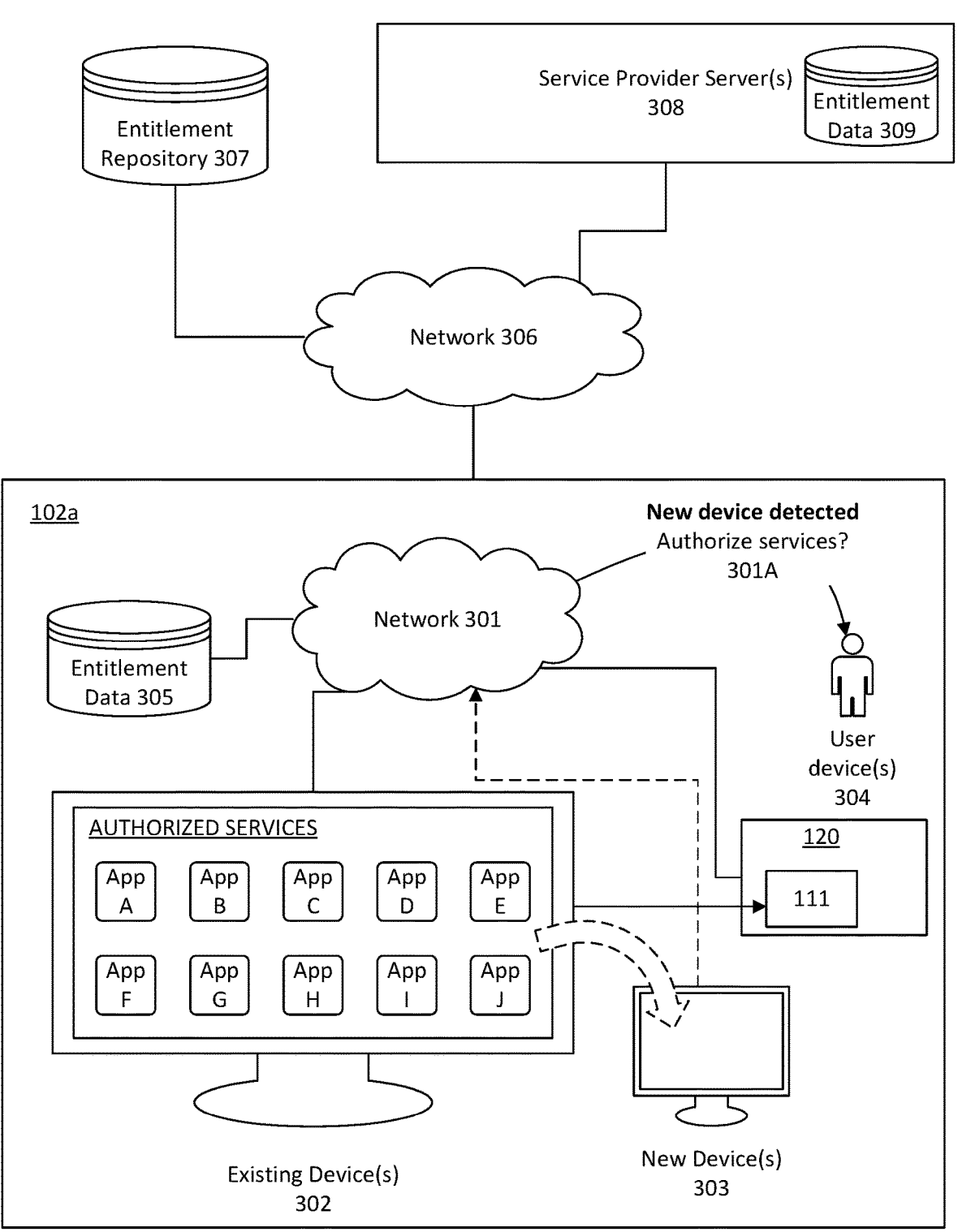
FIG. 3 shows an example of an environment for entitlement authorization for devices.

FIG. 3 shows an example of an environment 300 in which entitlement authorization for devices may occur. The environment 300 may comprise the premises 102a and/or other premises. Devices within the premises 102a may communicate via a network 301, which may be a wired or wireless network (e.g., IEEE 802.11 wi-fi network, Ethernet network, Multimedia over Coaxial Alliance (MoCA) network, power line network, etc.). The devices 302-304 may comprise the devices 112-116 and/or 125 such as display devices, tablet computers, laptop computers, personal computers, Internet-of-Things (IoT) devices, smartphones, smartwatches, wearable computing devices, and/or other devices. The existing device(s) 302 may have been authorized to provide various authorized services and/or their associated applications (e.g., streaming applications shown in FIG. 3 via icons A-J). The entitlement data 305 may be stored in the interface 120 and/or any other devices within the premises 102a. The entitlement data 305 may comprise data indicating services to which a user may be entitled. For example, the entitlement data 305 may comprise login credentials (e.g., user name and password) associated with the services to which the user is entitled. Also or alternatively, the entitlement data 305 may comprise authorization tokens for services which may have been received based on configuration of any of the devices in the premises 102a, such as the existing device(s) 302. The premises 102a may communicate via a network 306 (e.g., a wide-area network (WAN), the Internet, etc.) with entitlement repository 307 and/or with service provider server(s) 308. The entitlement repository 307 may comprise data indicating users' entitled services, authorization tokens for those services, and/or other entitlement data, and may be the same as the local entitlement data 305. The entitlement repository 307 may store entitlement data based on users' service subscriptions, and the local entitlement data 305 may store this data locally. The service provider server(s) 308 may store entitlement data 309. The service provider server(s) 308 may be comprised by the content server 106 and may be various content sources (e.g., NETFLIX, HULU, PRIME VIDEO, HBOMAX, STARZ, NBCS-PORTS, ESPN, etc.). The entitlement data 309 may comprise user profile data associated with certain various content service providers. For example, the service provider server(s) 308 may store the entitlement data 309 indicating entitled users and/or authorization tokens for entitled users for their corresponding service.

A device 303, such as a new smart television, may comprise information indicating services available for authorization. For example, the new smart television may have stock and/or preinstalled applications associated with various streaming services. Additional applications may be downloaded to the device 303 after it connects to a network, such as network 301 in a user's premises 102a. User credentials for these services may be obtained from another device, such as any other device in the premises 102a (e.g., local entitlement data 305), a remote entitlement repository 307, etc., and as explained below, the new device 303 may automatically obtain authorization for these services, thereby simplifying the installation process.

After the new device 303 joins the network 301 (e.g., by logging in to a local wi-fi network), the user may be prompted to select one or more of the preinstalled applications and/or select other applications for authorization (described below in connection with FIG. 5). Also or alternatively, the gateway 111 (or the authentication aggregator or another device in the premises 102a) may automatically authorize the new device 303 for all of the services that are authorized for one or more existing devices 302, as indicated by way of example with the outlined block arrow in FIG. 3. Also or alternatively, the gateway 111 may communicate with the existing device(s) 302 to request this information. Those services may be identified, for example, in the credentials in local entitlement data 305, remote entitlement repository 307, etc., as those credentials may identify which services are authorized for which device 302. Using the features described herein, the user's credentials for these services may be obtained automatically, and the authorizations may be performed for multiple services together (e.g., the authorizations may be batch-processed). Batch-processing the entitlement authorizations may allow for more efficient configuration of devices.

Figure 4:
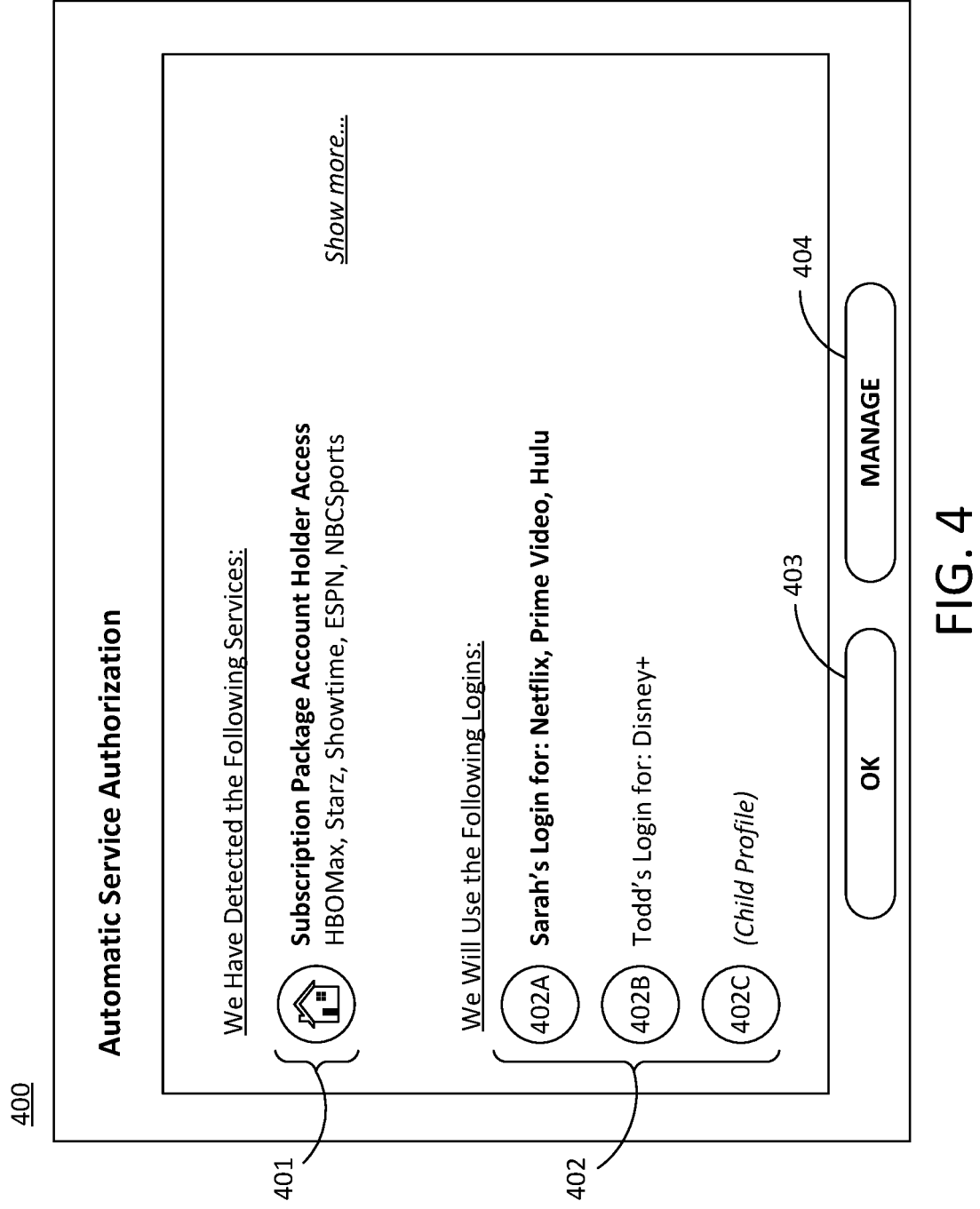
FIG. 4 shows an example graphical user interface indicating detected services for automatic authorization.

FIG. 4 shows an example user profile interface 400, which may be output for display by a new device 303 and/or by any other device associated with the premises 102a. For example, user profile data may be retrieved via the entitlement data 305, the entitlement repository 307, and/or the entitlement data 309. For example, the gateway 111 may serve as the authentication aggregator and may manage a wireless network 301 at the premises 102a. After the new device 303 logs in to the wireless network 301, the gateway 111 may send a message to the new device 303 to inquire as to whether the new device 303 supports the automatic authentication process described herein. If the new device 303 responds in the affirmative, then the gateway 111 may retrieve entitlement data 305 and send the new device 303 information indicating details of the various service entitlements for the devices and/or users at the premises 102a. This may include, for example, informing the new device 303 that the household has a video service subscription (e.g., a device that receives fiber and/or coaxial cable video, satellite video, etc.), and/or that there are individuals with personal entitlements to different online services (e.g., one user who has a NETFLIX account, another who has a PEACOCK account, etc.). This may also include providing the new device 303 with the login credentials (e.g., user name, password, etc.) for the various services, so that the new device 303 may automatically authenticate itself for those services.

The interface 400 may allow users to manage access, by the new device 303, to various services that are available to the devices and/or users at the premises 102a. The interface 400 shows an example user profile overview for automatic service authorization. The interface 400 may include an interface element 403 which may be used to indicate approval for the automatic authorization of services as they are output via the interface 400. Based on selection of the option to proceed, as indicated by the interface element 403, the example shown in FIG. 6A may be output (discussed below). The interface 400 may include an interface element 404 which may be used to modify the services selected for automatic authorization. Also or alternatively, via the interface element 404, a user may modify logins for individual profiles and/or modify their subscription package.

For example, after a new device 303 such as a smart television joins a network 301, a profile interface may be output by the new device 303 (e.g., for setup of the new smart television). The interface 400 may include profile information for services that may be generally available to all users at the premises (e.g., via an authorized device, such as a digital video recorder (DVR)). Subscription package account holder access information 401 may indicate services that are available to the premises 102a. For example, data associated with the subscription package account holder access information 401 may be retrieved via the entitlement data 305, the entitlement repository 307, the entitlement data 309, and/or other locations. For example, the subscription package account holder access information 401 may indicate that an authorized DVR at the premises 102a is entitled to receive service from content providers such as NBC, ABC, ESPN, HBO, etc. The access may indicate services (e.g., channels, streaming services, etc.) that the user (or device) is entitled to receive, and may be subscription-based, but need not be associated with financial payment.

The interface 400 may also comprise individual user profiles 402, indicating services that are authorized on an individual basis for specific users (e.g., streaming service such as NETFLIX may grant access based on user login credentials). For example, data associated with the user profiles 402 may be retrieved via the entitlement data 305, the entitlement repository 307, the entitlement data 309, and/or other locations. For example, profile 402A may be associated with example user Sarah. Sarah may be entitled to services beyond those in the subscription package account holder access information 401 discussed above. The profile 402A may indicate that Sarah gives permission to the new device 303 to allow it to use her credentials and automatically log in to her entitled services (e.g., NETFLIX, PRIME VIDEO, and HULU). Similarly, profile 402B may be associated with another example user Todd. Todd may be entitled to OTT services beyond those in the subscription package account holder access information 401 discussed above. The profile 402B may indicate that Todd gives permission to the new device 303 to allow it to use his credentials and automatically log in to his entitled services (e.g., DISNEY+). Profile 402C may be associated with yet another example user Alex. Profiles such as the profile 402C may be designated as child profiles, which may comprise further configuration and/or content control features. The interface element 404 may allow for configuration of access for the child profile (e.g., configuring which services the child user may access).

Figure 5:
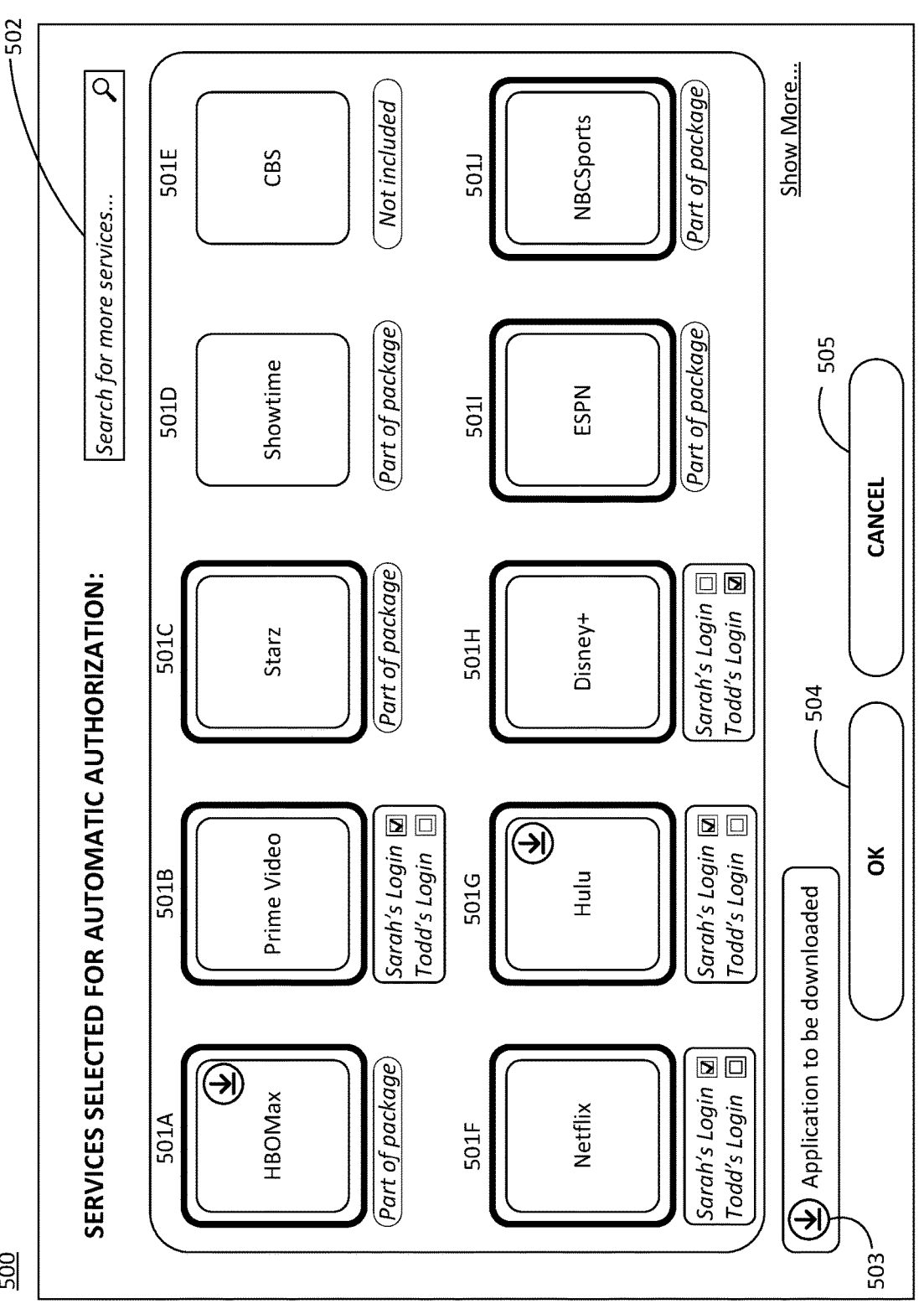
FIG. 5 shows an example graphical user interface for configuring automatic authorization of services.

FIG. 5 shows an example graphical user interface 500 for application authorization. In the example where the new smart television device joins the network, the user may be prompted to select one or more services for batch authorization. For example, after a user indicates that the automatic service authorization should be configured (e.g., by selecting the interface element 404), the interface 500 may be output for display by the new device 303 and/or by any other device associated with the premises 102a. The interface 500 may indicate available services 501A-501J, which may be selectable for authorization. For example, data indicating which services are available may be retrieved via devices associated with the premises 102a (e.g., the existing device(s) 302, the gateway 111, etc.), the entitlement data 305, the entitlement repository 307, the entitlement data 309, and/or other locations, to offer services that are already authorized at the premises. The available services 501A-501J may also or alternatively comprise preinstalled applications available on the new device 303. The interface 500 may comprise a search bar 502, which may allow for searching and selection of services beyond those comprised in the available services 501A-501J. The interface 500 may comprise a download indicator 503, which may show that an application for a service is not already present on the new device 303 (for example, if a service authorized for another device does not have a preinstalled application on the new device 303). After services are selected for authorization, any applications for selected services that are not present on the new device 303 may be downloaded. For example, the services 501A and 501G are flagged with the indicator 503, so their applications may be downloaded after they are selected for automatic authorization via the interface 500. The available services 501A-501J may comprise services to which a user may be entitled based on their subscription package (denoted in FIG. 5 as part of a package), services to which the user may not be entitled (denoted in FIG. 5 as not included), and/or services to which the user may be entitled based on individual credentials (as described in connection with FIG. 4). For example, multiple users may have login credentials for a service, and users may indicate the credentials to be used for authorizing that service (e.g., Sarah's credentials for NETFLIX and Todd's credentials for DISNEY+).

The interface 500 may identify the various available services, as well as the login credentials for the services. For example, the "PRIME VIDEO" service 501B includes the identifiers for Sarah's login and Todd's login (e.g., identifying that different credentials are available for the service), by identifying the users Sarah and Todd (e.g., identifying their user profiles), or identifying them by their user names for the service. The user may select one (or both, if supported by the service) of the identified logins, and the credentials for the selected login (e.g., user name, password, etc.) may be used for the automatic authorization described herein.

The interface 500 may comprise interface elements 504-505. The interface element 504 may be used to request permission to proceed with using the selected credentials to automatically authenticate with the selected services, and selection of the element 504 may indicate the user has given such permission. The interface element 505 may be used to return to the user profile interface 400 (e.g., for modification of options such as login credentials, subscription package contents, etc.). For example, a user may want to add login credentials to one of the profiles 402A-402C, so using the interface element 505 may output the interface 400. Based on selection of the option to proceed via the interface element 504, the example shown in FIG. 6A may be output.

FIG. 6A shows an example interface 600A indicating authorization progress. As the selected services 501A-501J are submitted for authorization, the interface 600A may comprise authorization progress messages 601-603 indicating successful and/or failed authorization attempts, and/or steps taken as part of the attempts. For example, information indicating authorization progress (e.g., as shown in the messages 601-603) may be retrieved via the service provider(s) 308, the entitlement repository 307, the entitlement data 305, and/or other locations. The example messages indicated in the messages 601-603 in FIG. 6A may be combined and/or further divided and are not intended to be an exhaustive list of steps. The interface 600A may comprise interface element 604, indicating the overall progress of the entitlement authorization(s). The authorization progress messages 601, for example, may indicate the authorization steps for HBOMAX. In this example, HBOMAX may be a household-entitled service via a subscription package (e.g., the subscription package may include HBO, which may further entitle the user(s) to the streaming service HBOMAX). In some cases, an application for a service may not be preinstalled on the new device, so the messages 601 may indicate that the application is being downloaded. The messages 601 may indicate that the household HBO credentials are being transmitted to the service provider. The messages 601 may include messages indicating that entitlement authorization is in the process of being confirmed. The messages 601 may indicate the successful authorization of HBOMAX.

The authorization progress messages 602, for example, may indicate the authorization steps for NBCSPORTS. In this example, NBCSPORTS may be a household-entitled service via a subscription package. The messages 602 may indicate that the household NBCSPORTS credentials are being transmitted to the service provider. The messages 602 may include messages indicating that entitlement authorizations are in the process of being confirmed. The messages 602 may indicate failure to authorize NBCSPORTS. Entitlement authorization may fail for various reasons, such as an unreliable connection, server issues, and/or other errors. Services with failed authorization may be selected for authorization again. The interface element 604 may indicate to the user how much time is left until the selected services are authorized.

Figure 6B:
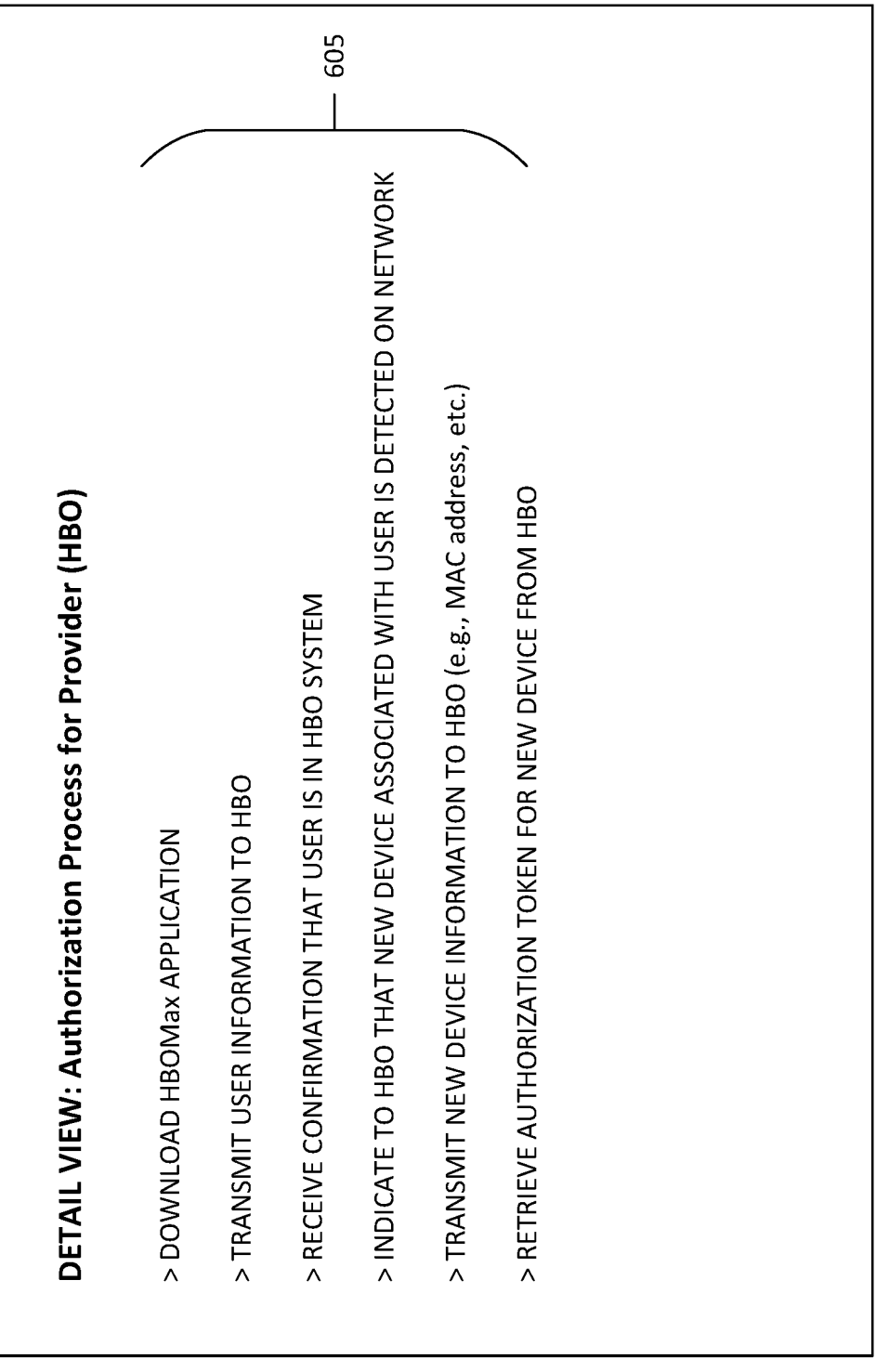
FIG. 6B shows another example of authorization progress messages.

FIG. 6B shows an interface 600B indicating detailed authorization progress for an example service. The interface 600B may comprise messages 605, which may indicate steps taken for authorizing a service with its respective service provider (e.g., authorizing the service HBOMAX with the provider HBO). For example, information indicating authorization progress (e.g., as shown in the messages 601-603) may be retrieved via the service provider(s) 308, the entitlement repository 307, the entitlement data 305, and/or other locations. The example messages indicated in the messages 605 in FIG. 6B may be combined and/or further divided and are not intended to be an exhaustive list of steps. For example, the messages 605 may indicate that an application for a service is being downloaded (e.g., if the application is not installed on the new device). The messages 605 may indicate that user information is being transmitted to a service provider (e.g., HBO). The user information may be transmitted by the gateway 111 and/or other devices in the premises 102a. The user information may indicate user login credentials and/or data indicating a user's entitlement to the service. The messages 605 may indicate that the user is entitled to the service of interest. The messages 605 may indicate that a new device may be associated with the user. The messages 605 may indicate that identifying information associated with the new device is being transmitted to the service provider, which may allow for more efficient service authorization. The messages 605 may indicate that authorization token(s) associated with the user and/or new device is being received from the service provider.

Figure 7:
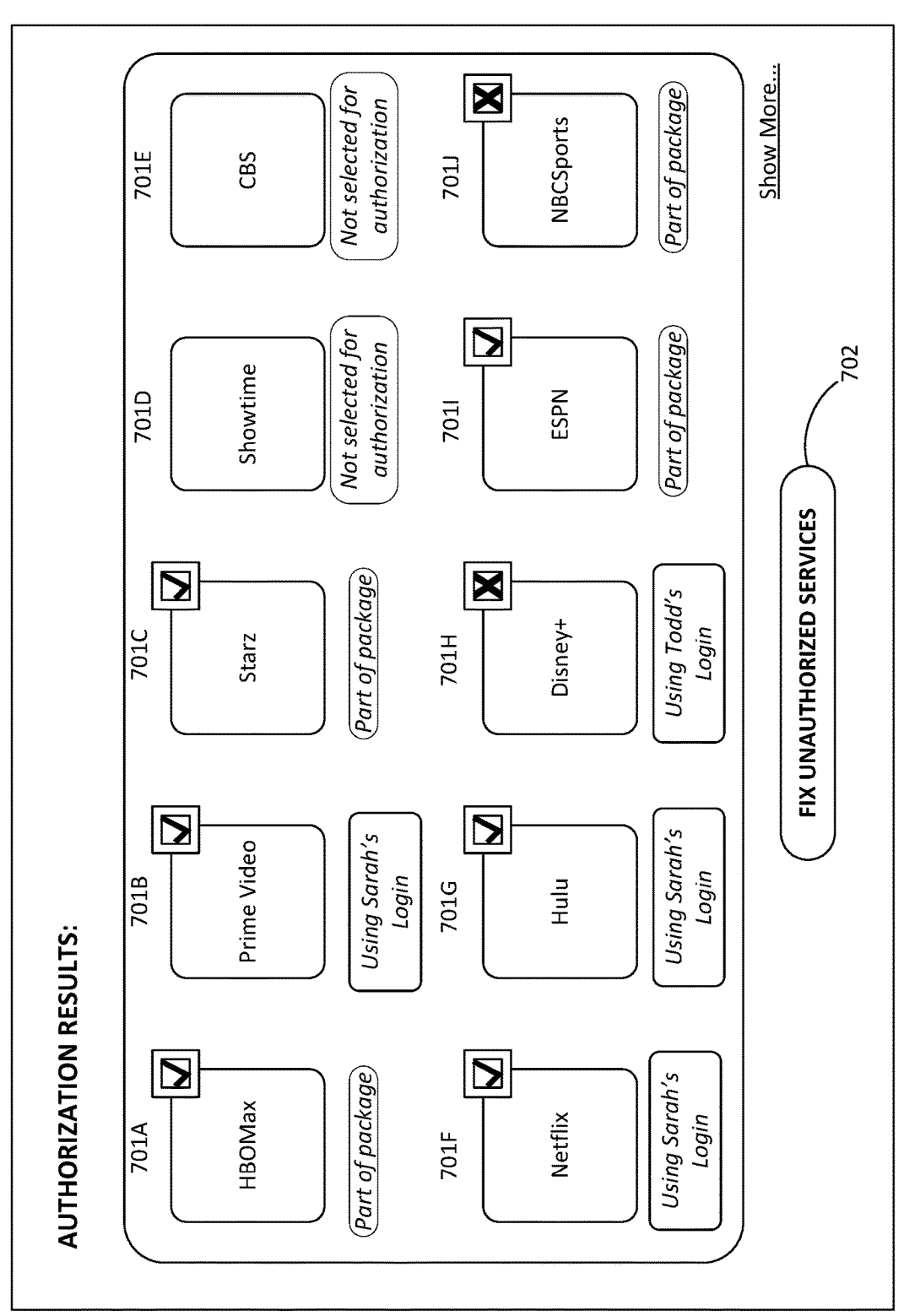
FIG. 7 shows example results of authorization requests.

FIG. 7 shows an interface 700 indicating example results of authorization requests. Authorization for the selected services may be entirely successful. Alternatively, authorization for some (or all) of the selected services may fail (e.g., if the credentials are outdated, or the service declines to authorize another device, etc.). The interface 700 may comprise authorization indicators 701A-701J, which may indicate successful and/or failed authorizations. For example, data indicating which services are successfully or unsuccessfully authorized or which services were not selected for authorization may be retrieved via devices associated with the premises 102a (e.g., the gateway 111, etc.), the entitlement data 305, the entitlement repository 307, the entitlement data 309, and/or other locations. In the FIG. 7 example, DISNEY+ and NBCSPORTS may have had failed authorization attempts. They may be associated with the failed authorization indicators 701G and 701I, respectively. Authorization may fail for various reasons, including connectivity issues, server issues, that users may not be entitled to a service, and/or due to other reasons. Services not selected for automatic authorization (e.g., SHOWTIME and CBS) may be denoted by a message indicating that they were not selected for authorization. The interface 700 may comprise interface element 702, which may allow for new authorization attempts of failed and/or unauthorized services. In order to repair failed authorizations, the automatic authorization process may be implemented again and/or a user may add and/or modify credentials.

Figure 8A:
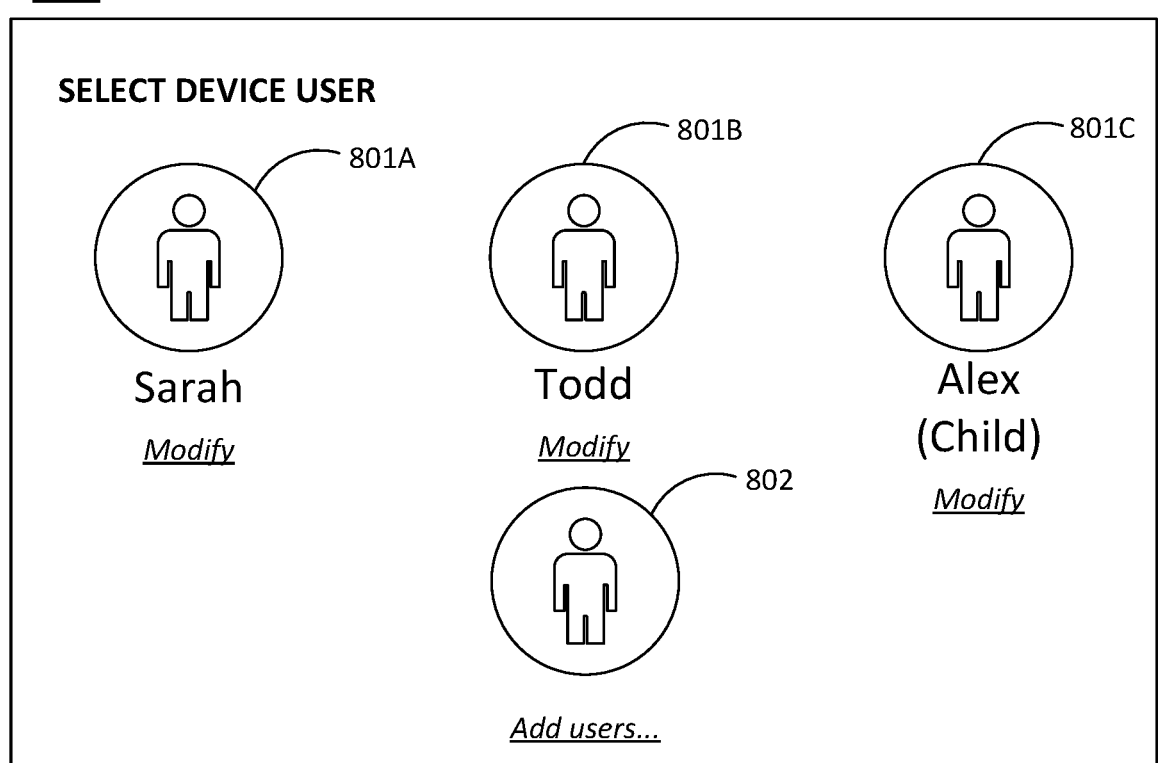
FIGS. 8A and 8B show example interfaces for user profiles and dashboards, respectively.
Figure 8B:
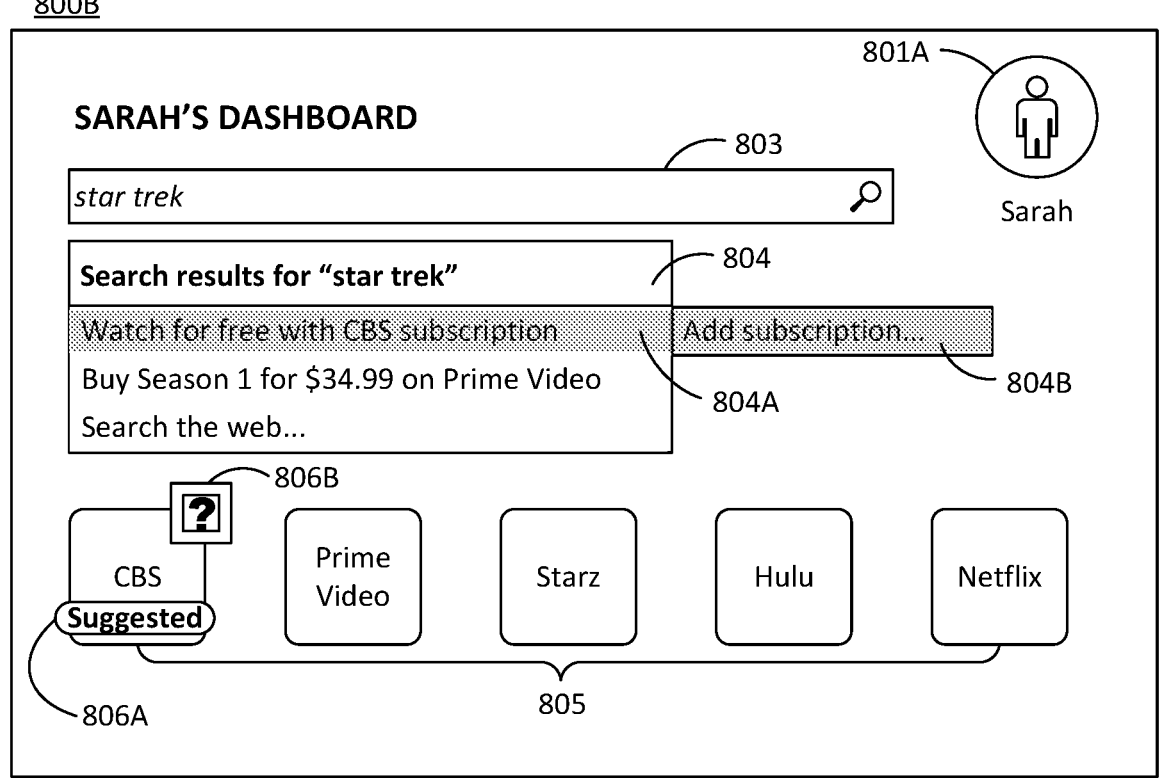

FIGS. 8A and 8B show example interfaces for user profiles and dashboards, respectively. For example, data indicated by user profile interfaces (e.g., various user profiles and their associated preferences, content search history, authorized services, etc.) may be retrieved via devices associated with the premises 102a (e.g., the gateway 111), the entitlement data 305, the entitlement repository 307, and/or the service provider(s) 308. FIG. 8A shows an example interface 800A, which comprises user profile icons 801A-801C associated with profiles for example users Sarah, Todd, and Alex, respectively. The interface 800A comprises interface element 802, which may allow for additional accounts to be added. The user accounts may be device user profiles, which may allow users to configure the device for different users. For example, Sarah may prefer NETFLIX and HBOMAX, so they may be configured to appear first on her dashboard. Todd, however, may prefer ESPN and NBCSPORTS, so his user profile may be configured to have those applications displayed first on his dashboard. The user profiles may be modified to alter various preferences, including application positions, authorized services, and/or other preferences.

FIG. 8B shows a user dashboard interface 800B for an example user Sarah. Sarah may access her dashboard via her profile icon 801A. The user dashboard interface 800B may comprise a search bar 803, search results 804, viewing option 804A, subscription management option 804B, applications 805, suggested application banner 806, and/or authorization indicator 806B. A user may search for content and/or applications via the search bar 803. For example, Sarah may search for "star trek" using the search bar 803. The search results 804 may comprise different application options through which Sarah may access the content she wants to watch. The applications 805 may comprise applications for services that may include the content a user wants to watch and/or similar content. The applications 805 may correspond to the search results 804. The viewing option 804A may indicate that "star trek" may be available to watch for free with a CBS subscription. However, if CBS is not authorized on the device (e.g., the new smart television device), the subscription management option 804B may allow Sarah to add a CBS subscription to her subscription package. The subscription management option 804B may allow a user to modify their subscription package(s) via the user dashboard interface 800B. Some services may be promoted to higher positions in the search results 804 and/or the applications 805 via advertising and/or licensing agreements with content providers, subscription providers (e.g., cable providers), and/or other entities. In the example in FIG. 8B, CBS may be a promoted service. The CBS application icon may be suggested 806A. If an application such as CBS is not authorized on the device, the authorization indicator 806B may indicate its status. For example, a question mark indicator may indicate that Sarah is not entitled to CBS, which may encourage her to add a CBS subscription to her subscription package. Revenue from subscriptions may be shared between the content providers and the device operating system manufacturer and/or other entities.

Figure 9:
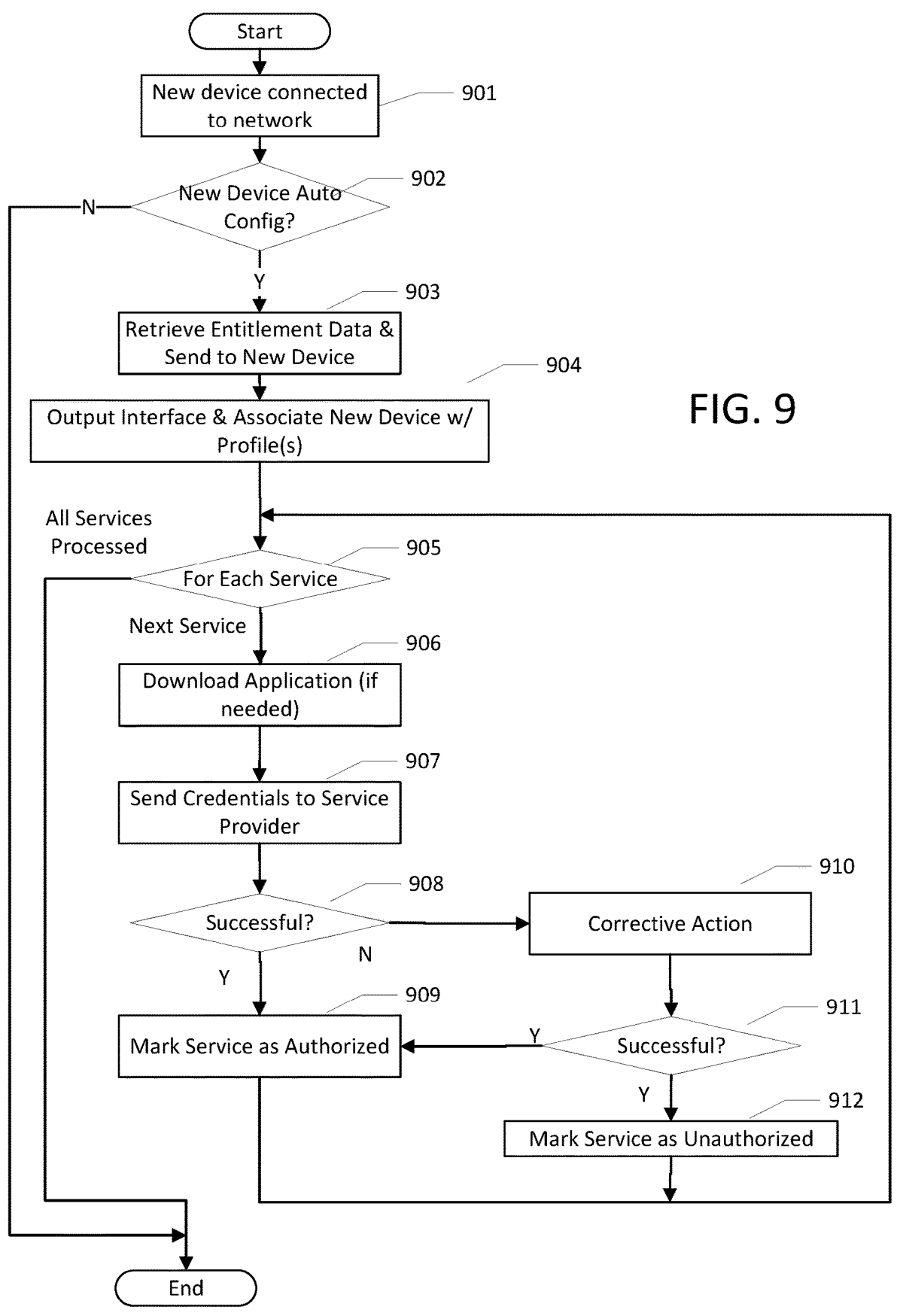
FIG. 9 is a flow chart showing an example method for authorizing services for devices joining networks.

FIG. 9 is a flow chart showing an example method for authorizing services for a new device. The method may be performed by any device, such as gateway 111, that can manage authorizations for services used at the premises 102a. At step 901, a new device 303 may join network 301 (e.g., by logging in to a wi-fi network). At step 902, a determination may be made as to whether the new device 303 supports automatic batch authentication of services. This may be accomplished by, for example, sending a message to the new device 303, requesting a response to indicate that it supports such automatic configuration, or by performing a database lookup based on a device identifier obtained from the new device 303. If the new device 303 does not support automatic authentication, then the process may simply end. If the new device 303 supports automatic authentication, then in step 903, the entitlement data 305 may be retrieved and sent to the new device 303. This data may comprise identifications of the various services in the profile information discussed above, and may comprise credentials (e.g., user identification, passwords, etc.) for those services. The entitlement data 305 may be retrieved from a storage device, which may be another authorized device, such as another video display device 302 at the premises 102a.

At step 904, an interface 500 may be output (e.g., by the new device 303), informing the user as to the services that are available for automatic login, and the credentials for the listed services. The interface 500 may be automatically output based on the new device 303 initially connected to the network 301, as part of initial configuration of the new device 303, and some or all of the ensuing steps may be automatically performed based on the new device 303 joining the network and without requiring the user to enter any service credentials. As discussed above, the interface 500 may provide the user with the option to allow the new device 303 to use the listed credentials to authorize itself with the listed services, and may also allow the user to customize the authentication (e.g., which services will be authenticated on the new device 303, which credentials will be used, etc.). As part of this, the new device 303 may be associated with one or more profiles for accessing the various services.

At step 905, a looping process may begin for each of the various services that have been selected for automatic authentication. The looping process 905 may be performed sequentially for each of a plurality of services. At step 906, if an application for the current service is needed and is not already present on the new device 303, the application may be downloaded from a location whose address may be indicated in the entitlement data 305. At step 907, a login request may be sent to the service provider that provides the current service, and may include credentials for the service (e.g., user identification, password, etc.). The details of the requirements for this request may be defined by the service provider, and may be indicated in the associated application, entitlement data 305, or any other desired location. Sending the login request may involve one or more redirected communications. For example, some services may be interconnected. A subscription to a video provider (e.g., COMCAST) may allow a user (or their DVR) to access the HBO service, and there may be an associated streaming HBOMAX service that the subscriber is also allowed to access. The initial login request may be sent to a server for the HBOMAX service, and that server may redirect the requesting device (e.g., the new device 303) to log in to the video provider using the user's credentials with the video provider, and after a successful login, the video provider's server may redirect the requesting device to return to the HBOMAX service, and a token may be passed from the video provider's server to the HBOMAX service to indicate that the user successfully logged in to the video provider and is entitled to receive the HBOMAX service. The sending of the login request 907 may be performed by the new device 303 and/or by the gateway 111 on behalf of the new device 303. If performed by the gateway 111 on behalf of the new device, then the gateway 111 may send the login request 907 along with information identifying the new device 303 (e.g., a media access control—MAC—address), and may receive an authentication token from the service, indicating that the new device 303 is authorized to access the service. The gateway 111 may then send that authentication token to the new device 303, and the new device 303 may use the authentication token to request content from the service (the gateway 111 may assist with this as well, such as by sending the request on behalf of the new device 303).

In step 908, a determination may be made as to whether the login request was successful. If it was successful, then in step 909 information may be stored to indicate the successful login, and that the current service (and its application) is authorized for use on the new device 303. This information may include an authentication token from the server of the service provider, which may be stored as a cookie to be provided by the new device 303 to the service provider the next time the user wishes to use that service. As noted above, if the gateway 111 sent the login request 907 on behalf of the new device 303, then the gateway 111 may receive the authentication token in response, and the marking 909 may include sending the authentication token to the new device 303. If the automatic login was not successful, then in step 910, corrective action may be taken to repair authorization for the current service. The corrective action may include prompting the user to indicate an error, and requesting that the user review and provide an updated or corrected credential if needed. For example, if the entitlement data 305 contained an outdated password, then the corrective action may entail asking the user to provide an updated password for use in another login attempt. The entitlement data 305 may also be updated to reflect any updates occurring from the corrective action 910. While the corrective action 910 is illustrated as occurring in each pass of the loop 905, the corrective action 910 may be performed after all of the services have been attempted. If the corrective action 910 is successful 911, then the service may be marked as authorized 909 for the new device 303. If the corrective action 910 still fails, then the service may be marked 912 as unauthorized for the new device 303.

After marking the current service as being authorized 909 or unauthorized 912, the process may return to step 905 to handle the next service to be authorized. If all services have been processed for automatic authorization, then the automatic authorization process may end. Following the automatic authorization process, the user may choose to use any of the authorized applications (e.g., by selecting the HBOMAX application from a menu), and the new device 303 may use the corresponding authentication token (and login credentials, as needed) to initiate the requested service with the corresponding service provider. The requested service may comprise delivering streaming content, such as a movie, to the new device 303 from a content source 106.

Although not separately illustrated, the various steps above may also include generating an output status update to allow the user to see the progress in the automatic authorization. These messages may appear as shown in FIGS. 6A-6B, and may include textual explanations of the progress, status bar updates, etc.

Figure 10:
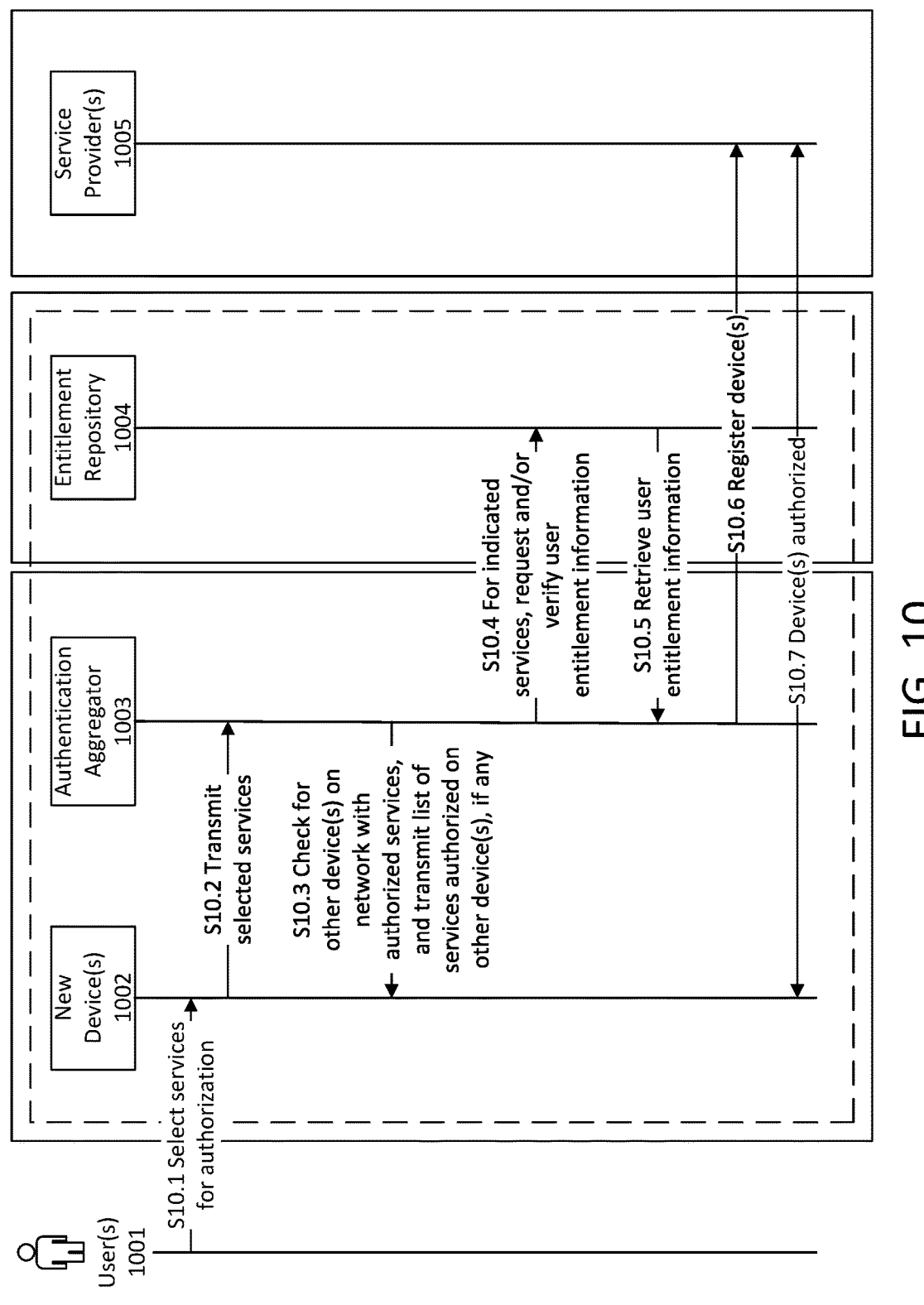
FIG. 10 is a sequence diagram showing an example workflow for authorizing services.

FIG. 10 is a sequence diagram showing an example workflow 1000 for authorizing services. The workflow 1000 may comprise user(s) 1001, new device(s) 1002, authentication aggregator 1003, entitlement repository 1004, and/or service provider(s) 1005. A new device, such as the device(s) 303, may be detected joining an internal network. At step S10.1, the user(s) 1001 may select services for authorization on the new device(s) 1002, similar to the examples shown in FIG. 5. At step S10.2, the new device(s) 1002 may transmit data indicating the services selected for automatic authorization to the authentication aggregator 1003 (e.g., the gateway 111, the modem 110, and/or other devices). At step S10.3, the authentication aggregator 1003 may determine whether there may be existing device(s) such as the device(s) 302 on the network with authorized services. If there are, the authentication aggregator 1003 may initiate transmission of a list of the authorized services to the new device(s) 1002.

At step S10.4, the authentication aggregator 1003 may request and/or verify user entitlement information associated with the services selected for authorization via the entitlement repository 1004. The entitlement repository may be stored locally (e.g., via the entitlement data 305) and/or externally (e.g., via the external entitlement repository 307 and/or the entitlement data 309 stored in the service provider server(s) 308). At step S10.5, user entitlement information may be transmitted from the entitlement repository 1004 to the authentication aggregator 1003. For example, the user entitlement information may comprise authorization tokens, login credentials, and/or other entitlement information. At step S10.6, the authentication aggregator 1003 may register the new device(s) 303 with the service provider(s) 1005. Step S10.6 may comprise sequentially sending login requests to the service provider(s) 1005 to authorize the new device(s) 1002 to receive multiple content services (e.g., streaming services). At step S10.7, the new device(s) 1002 may be authorized. Step S10.7 may comprise authorizing the entitled services for which user entitlement data was retrieved.

Although examples are described above, features and/or steps of those examples may be combined, divided, omitted, rearranged, revised, and/or augmented in any desired manner. Various alterations, modifications, and improvements may be made. For example, while the FIG. 5 example requests user input, the automatic authentication may be performed without requesting such input. Instead, the process may automatically request authentication for all available services that are authorized for other devices at the premises (e.g., associated with the network, indicated in entitlement data 305, etc.). If multiple different logins are available for a particular service, the automatic authentication may simply default to one of the logins, such as a profile that is designated as the primary profile for the premises. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

retrieving, by a computing device, based on a user device newly joining a premises network, and from connected user devices that are already connected to the premises network, login credentials for one or more user profiles for each of a plurality of video streaming services associated with the premises network;

sending, to the newly-joining user device, the login credentials for the one or more user profiles for each of the plurality of video streaming services;

receiving authentication information indicating successful login to the plurality of video streaming services; and using the authentication information to provide the plurality of video streaming services at the newly-joining user device.

2. The method of claim 1, wherein the retrieving is based on account information indicating entitled services retrieved via an entitlement repository.

3. The method of claim 1, further comprising, receiving, via an interface, a selection of a login credential for use with at least one service of the plurality of video streaming services associated with the premises network.

4. The method of claim 1, further comprising:

determining that the newly-joining user device is missing one or more applications associated with the plurality of video streaming services; and downloading the one or more missing applications.

5. The method of claim 1, wherein the computing device retrieving the login credentials is via a gateway comprising an authorization entitlement repository.

6. The method of claim 1, wherein the login credentials comprise a password, and the method further comprises:

causing output of an interface that identifies the login credentials by identifying a user name associated with the password.

7. The method of claim 1, further comprising:

retrieving data indicating failure to authorize at least one of the plurality of video streaming services;

outputting, to a user, a message indicating an error in authorizing the at least one of the plurality of video streaming services; and repairing, based on user input, the failed authorization.

8. A method comprising:

retrieving, by a computing device, based on a user device newly joining a premises network, and from connected user devices that are already connected to the premises network, login credentials for one or more user profiles for each of a plurality of video streaming services associated with the premises network;

sending, to the user device, the login credentials for the one or more user profiles for each of the plurality of video streaming services;

causing, via the computing device, output of a user interface that:

identifies the plurality of video streaming services; and identifies the one or more user profiles for each of the plurality of video streaming services, wherein two user profiles are identified for one of the plurality of video streaming services;

receiving, via the user interface:

selection of one or more of the pluralit of video streaming services; and for the selected one or more of the plurality of video streaming services, selection of the one or more user user profiles; and sequentially sending login requests, via the computing device, to authorize the user device to receive the selected one or more of the plurality of video streaming services.

9. The method of claim 8, further comprising receiving, via the user interface, information indicating that the user device is not to be authorized for at least one of the plurality of video streaming services.

10. The method of claim 8, further comprising causing output of status messages indicating login process as the selected one or more of the plurality of video streaming services are sequentially authorized.

11. The method of claim 8, further comprising:

automatically causing output of the user interface based on the user device initially connecting to a wireless network.

12. The method of claim 8, wherein the user interface also indicates that at least one of the plurality of video streaming services is available via a service package.

13. The method of claim 8, further comprising updating the user interface to indicate sequential successful logins for the selected one or more of the plurality of video streaming services.

14. The method of claim 8, further comprising causing output of a second user interface listing the plurality of video streaming services, and indicating success or failure for logins of the plurality of video streaming services.

15. The method of claim 8, further comprising causing output of a second user interface listing the plurality of video streaming services, and indicating success or failure for logins of the plurality of video streaming services, wherein a successful login is indicated with an identification of a user profile used for the successful login.

16. An apparatus comprising:

at least one processor;

a memory storing instructions that, when executed by the at least one processor, configure the apparatus to:

retrieve, based on a user device newly joining a premises network, and from connected user devices that are already connected to the premises network, login credentials, for one or more user profiles for each of a plurality of video streaming services associates with the premises network;

send, to the newly-joining user device, the login credentials for the one or more user profiles for each of the plurality of video streaming services;

receive authentication information indicating successful login to the plurality of video streaming services; and use the authentication information to provide the plurality of video streaming services at the newly-joining user device.

17. The apparatus of claim 16, wherein the instructions, when executed by the at least one processor, further cause the apparatus to:

receive, via an interface, a selection of the login credentials for use with at least one service of the plurality of video streaming services associated with the premises network.

18. The apparatus of claim 16, wherein the login credentials are retrieved via a gateway comprising an authorization entitlement repository.

19. The apparatus of claim 16, wherein the instructions, when executed by the at least one processor, further configure the apparatus to:

determine that the newly-joining user device is missing one or more applications associated with the plurality of video streaming services; and download the one or more missing applications.

20. The apparatus of claim 16, wherein retrieving the login credentials is via a gateway comprising an authorization entitlement repository.

21. The apparatus of claim 16, wherein the login credentials comprise a password, and wherein the instructions, when executed by the at least one processor, further configure the apparatus to:

cause output of an interface that identifies the login credentials by identifying a user name associated with the password.

22. The apparatus of claim 16, wherein the instructions, when executed by the at least one processor, further configure the apparatus to:

retrieve data indicating failure to authorize at least one of the plurality of video streaming services;

output, to a user, a message indicating an error in authorizing the at least one of the plurality of video streaming services; and repair, based on user input, the failed authorization.

23. A system comprising:

a computing device; and a user device newly joining a premises network;

wherein the computing device comprises:

at least one processor;

memory storing instructions that, when executed by the at least one processor, configure the computing device to:

retrieve, based on the newly-joining user device, and from connected user devices that are already connected to the premises network, login credentials for one or more user profiles for each of a plurality of video streaming services associates with the premises network;

send, to the newly-joining user device, the login credentials for the one or more user profiles for each of the plurality of video streaming services;

receive authentication information indicating successful login to the plurality of video streaming services; and use the authentication information to provide the plurality of video streaming services at the newly-joining user device.

24. The system of claim 23, wherein the retrieving is based on account information indicating entitled services retrieved via an entitlement repository.

25. The system of claim 23, wherein the instructions, when executed by the at least one processor, further configure the computing device to:

receive, via an interface, a selection of a login credential for use with at least one service of the plurality of video streaming services associated with the premises network.

26. The system of claim 23, wherein the instructions, when executed by the at least one processor, further configure the computing device to:

determine that the computing device is missing one or more applications associated with the plurality of video streaming services; and download the one or more missing applications.

27. The system of claim 23, wherein the computing device retrieving the login credentials is via a gateway comprising an authorization entitlement repository.

28. The system of claim 23, wherein the login credentials comprise a password, and wherein the instructions, when executed by the at least one processor, further configure the computing device to:

cause output of an interface that identifies the login credentials by identifying a user name associated with the password.

29. The system of claim 23, wherein the instructions, when executed by the at least one processor, further configure the computing device to:

retrieve data indicating failure to authorize at least one of the plurality of video streaming services;

output, to a user, a message indicating an error in authorizing the at least one of the plurality of video streaming services; and repair, based on user input, the failed authorization.

30. One or more non-transitory computer-readable media storing instructions that, when executed, cause:

retrieving, by a computing device, based on a user device newly joining a premises network, and from connected user devices that are already connected to the premises network, login credentials for one or more user profiles for each of a plurality of video streaming services associated with the premises network;

sending, to the newly-joining user device, the login credentials for the one or more user profiles for each of the plurality of video streaming services;

receiving authentication information indicating successful login to the plurality of video streaming services; and using the authentication information to provide the plurality of video streaming services at the newly-joining user device.

31. The one or more non-transitory computer-readable media storing instructions of claim 30, wherein the retrieving is based on account information indicating entitled services retrieved via an entitlement repository.

32. The one or more non-transitory computer-readable media storing instructions of claim 30, wherein the instructions, when executed, cause:

receiving, via an interface, a selection of a login credential for use with at least one service of the plurality of video streaming services associated with the premises network.

33. The one or more non-transitory computer-readable media storing instructions of claim 30, wherein the instructions, when executed, cause:

determining that the computing device is missing one or more applications associated with the plurality of video streaming services; and downloading the one or more missing applications.

34. The one or more non-transitory computer-readable media storing instructions of claim 30, wherein the computing device retrieving the login credentials is via a gateway comprising an authorization entitlement repository.

35. The one or more non-transitory computer-readable media storing instructions of claim 30, wherein the login credentials comprise a password, and wherein the instructions, when executed, cause:

output of an interface that identifies the login credentials by identifying a user name associated with the password.

36. The one or more non-transitory computer-readable media storing instructions of claim 30, wherein the instructions, when executed, cause:

retrieving data indicating failure to authorize at least one of the plurality of video streaming services;

outputting, to a user, a message indicating an error in authorizing the at least one of the plurality of video streaming services; and repairing, based on user input, the failed authorization.

* * * * *